(12) United States Patent
Rudelic (10) Patent No.: US 7,613,891 B2
(45) Date of Patent: Nov. 3, 2009

(54) METHODS AND APPARATUS FOR PROVIDING A READ ACCESS CONTROL SYSTEM ASSOCIATED WITH A FLASH DEVICE

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 11/429,025

(22) Filed: May 4, 2006

(65) Prior Publication Data

US 2007/0260836 A1    Nov. 8, 2007

(51) Int. Cl.
G06F 12/14    (2006.01)
(52) U.S. Cl. ...................................... 711/163
(58) Field of Classification Search .................. 711/163
See application file for complete search history.

(56) References Cited

U.S. PATENT DOCUMENTS

| | | | |
|---|---|---|---|
| 6,564,317 B1 * | 5/2003 | Hale et al. ..................... 713/1 |
| 6,615,355 B2 | 9/2003 | Mattison | |
| 6,681,304 B1 | 1/2004 | Vogt | |
| 6,684,326 B1 * | 1/2004 | Cromer et al. ................. 713/2 |
| 7,296,149 B2 * | 11/2007 | Hiltgen ........................ 713/161 |
| 2004/0015709 A1 * | 1/2004 | Chen et al. ................... 713/193 |
| 2004/0236919 A1 | 11/2004 | Okaue | |
| 2006/0161790 A1 * | 7/2006 | Hunter et al. ............... 713/189 |
| 2006/0294513 A1 * | 12/2006 | Bar-El et al. ................ 717/168 |
| 2007/0022243 A1 * | 1/2007 | Rudelic ..................... 711/103 |

FOREIGN PATENT DOCUMENTS

WO    2004084231 A1    9/2004

OTHER PUBLICATIONS

John C. Rudelic, "Scheme for Securing Locally Generated Data With Authenticated Write Operations", U.S. Appl. No. 11/298,045, filed Dec. 8, 2005.
International Search Report mailed on Oct. 2, 2007 for International Application No. PCT/US2007/068005, 6 pgs.

* cited by examiner

*Primary Examiner*—Hetul Patel
(74) *Attorney, Agent, or Firm*—Schwabe, Williamson & Wyatt, P.C.

(57) ABSTRACT

A flash memory based processing apparatus including, among other things, an integrated controller to authenticate various operations, such as read, write, patch, and key operations, and directly control read access to partitions of the memory array of the flash device via operations in various read access modes. Other embodiments may be described and claimed herein.

20 Claims, 5 Drawing Sheets

METHODS AND APPARATUS FOR PROVIDING A READ ACCESS CONTROL SYSTEM ASSOCIATED WITH A FLASH DEVICE

TECHNICAL FIELD

The present disclosure relates generally to flash memory systems, and more particularly, to methods and apparatus for providing a read access control system associated with a flash device.

BACKGROUND

As more and more people are carrying and/or using electronic devices for work, education, and/or entertainment in various locations (e.g., offices, schools, airports, coffee shops, etc.), technological developments are being made to provide greater mobility and/or access while reducing cost and/or power consumption. In particular, a flash memory is a non-volatile memory, which may electrically program and erase digital information but retain the information without power. Without moving parts such as a hard drive, a flash memory may be well suited for portable or mobile electronic devices such as memory cards, universal serial bus (USB) flash drives, digital audio players (e.g., MPEG Audio Layer 3 (MP3) players), digital cameras, handheld computers, handheld gaming devices, cellular telephones, and/or medical devices.

DETAILED DESCRIPTION

In general, methods and apparatus for providing a read access control system associated with a flash device. The methods and apparatus described herein are not limited in this regard.

Figure 1:
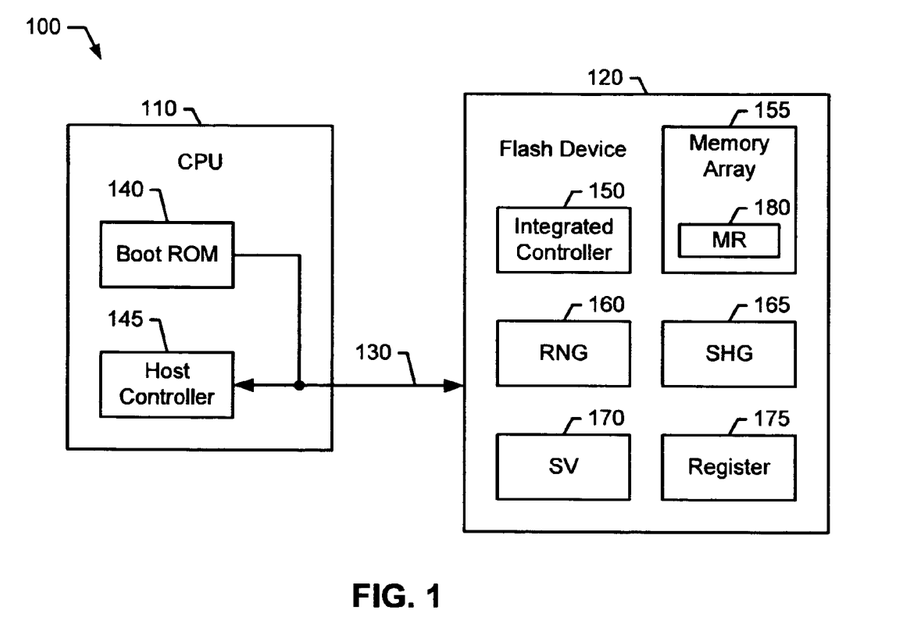
FIG. 1 is a schematic diagram representation of an example flash memory-based processing system according to an embodiment of the methods and apparatus disclosed herein.

Referring to FIG. 1, an example flash memory-based processing system 100 may include a central processing unit (CPU) 110 and a flash device 120. In general, the flash memory-based processing system 100 may be implemented in an electronic device (not shown). For example, the flash memory-based processing system 100 may be implemented in a desktop computer, a network server, a laptop computer, a handheld computer, a tablet computer, a cellular telephone (e.g., a smart phone), a pager, an audio and/or video player MP3 player or a DVD player), a gaming device, a digital camera, a navigation e.g., a global position system (GPS) device), a medical device (e.g., a heart rate monitor, a blood pressure monitor, etc.), a memory card, a USB flash drive, and/or other suitable relatively stationary, mobile, and/or portable electronic devices.

The CPU 110 may be operatively coupled to the flash device 120 via a flash interface 130. For example, the flash interface 130 may include a bus, and/or a direct link between the CPU 110 and the flash device 120. The CPU 110 may include a boot read only memory (ROM) 140 and a host controller 145. In one example, the boot ROM 140 may provide boot code to the flash device 120 for initialization. Alternatively, the flash device 120 may boot directly from itself. The host controller 145 (e.g., an application processor) may perform a variety of operations for the CPU 110. For example, the host controller 145 may process operations ranging from running an operating system (OS), an application to invoking the boot ROM 140 as mentioned above, and/or other suitable applications.

The flash device 120 may include an integrated controller 150, a memory array 155, a random number generator (RNG) 160, a secure hash generator (SHG) 165, a signature verifier (SV) 170, and a register 175. In general, the flash device 120 may internally authenticate operations to protect itself against malicious and/or inadvertent modifications. Prior to performing a requested operation such as read, write, patch, key, and/or other suitable operations, the flash device 120 may authenticate the requested operation internally. If the requested operation is authentic, the flash device 120 may perform the operation. Otherwise if the requested operation is not authentic, the flash device 120 may disregard the request.

In one example, the integrated controller 150 may control read access of the memory array 155 as described in detail below. In particular, the memory array 155 may include one or more floating gate transistors or cells (not shown) to store data, code, and/or other suitable information. To retrieve the data, code, or information stored in the memory array 155, the CPU 110 may send a read access command to the integrated controller 150 to request for read access of one or more memory ranges (e.g., the memory range 180) of the memory array 155. Although FIG. 1 depicts one memory range, the memory array 155 may include additional memory ranges.

The flash device 120 may determine whether a read access command is authentic based on signature verification. Briefly, the CPU 110 may request for a nonce value from the flash device 120. The random number generator 160 may generate and store the nonce value in the register 175. Accordingly, the integrated controller 150 may provide the nonce value to the CPU 110.

The CPU 110 (e.g., via the host controller 145) may calculate a first hash value. The first hash value may be associated with a message from the CPU 110 to the flash device 120. For example, the message may include a command to the flash device 120, corresponding data, and/or the nonce value requested from the flash device 120. The CPU 110 may sign the first hash value using a private key (e.g., authentication signature). In one example, the CPU 110 may operate in accordance with an asymmetric authentication algorithm (e.g., public key encryption developed by Rivest, Shamir, and Adleman (RSA)). Alternatively, the CPU 110 may operate in accordance with encryption standards developed by the National Institute of Standards and Technology (NIST) such as Advanced Encryption Standard (AES) (published Nov. 26, 2001), Data Encryption Standard (DES) (published Jan. 15, 1977), variations and/or evolutions of these standards, and/or other suitable encryption standards, algorithms, or technologies. The CPU 110 may forward the message and the authentication signature (e.g., an RSA signature) to the flash device 120.

Based on the command and the corresponding data associated with the message from the CPU 110 and the nonce value stored in the register 175, the secure hash generator 165 may generate a second hash value. The signature verifier 170 may verify the authentication signature associated with the message from the CPU 110. Accordingly, the integrated controller 150 may compare the first hash value to the second hash value. If the first hash value matches the second hash value, the message from the CPU 110 may be authenticated. Otherwise, the message from the CPU 110 may not be authenticated.

Further, as described in detail below, the register 175 may store one or more predefined values corresponding to the memory range 180. In particular, the integrated controller 150 may provide the predefined value(s) to the CPU 110 if the memory range 180 is disabled for read access.

While the components shown in FIG. 1 are depicted as separate blocks within the flash device 120, the functions performed by some of these blocks may be integrated within a single semiconductor circuit or may be implemented using two or more separate integrated circuits. For example, although the random number generator 160 and the secure hash generator 165 are depicted as separate blocks within the flash device 120, the random number generator 160 and the secure hash generator 165 may be integrated into a single component. The methods and apparatus described herein are not limited in this regard.

To further protect sensitive information, however, the integrated controller 150 may directly control read access of partition(s) of the memory array 155. In general, the memory range 180 may operate based on a read access mode such as a static read access mode or a dynamic read access mode as described in further detail below. In the static read access mode, for example, the integrated controller 150 may disable read access of the memory range 180 after allowing the CPU 110 to access the memory range 180. The memory range 180 may be enabled for read access again after the flash device 120 is reset. Alternatively, the memory range 180 may be disabled for read access after the flash device 120 is reset.

In the dynamic read access mode, the integrated controller 150 may toggle read access of the memory range 180 on or off. Similar to operation in the static read access mode, the integrated controller 150 may also enable the memory range 180 for read access after the flash device 120 is reset in the dynamic read access mode. However, the integrated controller 150 may also enable read access of the memory range 180 in response to receipt of an authenticated dynamic read access command from the CPU 110. By controlling read access of the memory range 180, the integrated controller 150 may determine whether information stored in the memory range 180 is accessible to various applications running on the CPU 110. Thus, the methods and apparatus described herein may isolate applications from each other and/or secure applications from non-secure applications.

Figure 2:
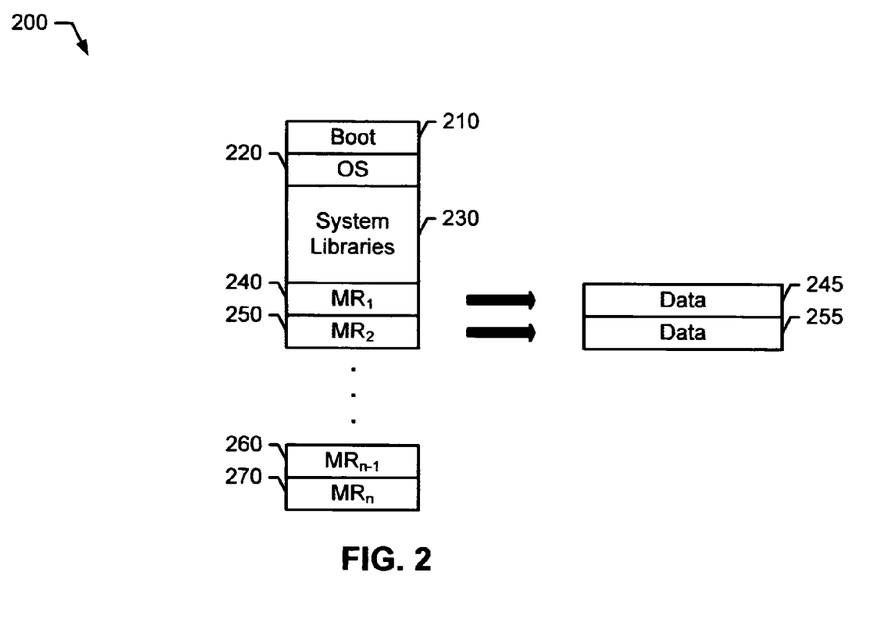
FIG. 2 depicts one example of a memory array configuration.

As noted above, a memory array (e.g., the memory array 155 of FIG. 1) may store a variety of information (e.g., code, data, etc.). Turning to FIG. 2, for example, a memory array configuration 200 may include one or more partitions, generally shown as 210, 220, 230, 240, 250, 260, and 270. Although FIG. 2 depicts a particular number of partitions, the memory array configuration 200 may include more or less partitions. Further, while FIG. 2 depicts a particular order of partitions, the methods and apparatus described herein are readily applicable to other suitable memory array configurations.

In particular, the memory array configuration 200 may include partitions for storing executable codes such as a boot partition 210, an operating system (OS) partition 220, and one or more system library partitions 230. The memory array configuration 200 may also include one or more partitions for storing sensitive information (e.g., user names, passwords, account numbers, etc.), generally shown as memory ranges 240 ($MR_1$), 250 ($MR_2$), 260 ($MR_{n-1}$) and 270 ($MR_n$). Although FIG. 2 depicts four memory ranges for storing sensitive information, the memory array configuration 200 may include more or less memory ranges.

To access each of the partitions of the memory array configuration 200, the CPU 110 may require authentication. In one example, a first memory range 240 may store data 245 whereas a second memory range 250 may store data 255. The CPU 110 may use one authentication key to have read access of the first memory range 240 and another authentication key to have read access of the second memory range 250. Accordingly, the CPU 110 may access the data 245 stored in the first memory range 240 and the data 255 stored in the second memory range 255 with the proper authentication keys.

The integrated controller 150 may enable read access of the first memory range 240 so that the CPU 110 may retrieve the data 245 with an authentication key associated with the first memory range 240. In another example, the integrated controller 150 may enable read of the second memory range 250 so that the CPU 110 may retrieve the data 255 with an authentication key associated with the second memory range 250. As described in detail below, if the integrated controller 150 disabled read access of the memory range 180, the integrated controller 150 may provide a predefined value stored in the register 175 to the CPU 110 even though the CPU 110 may have an authentication key associated with the memory range 180.

Figure 3:
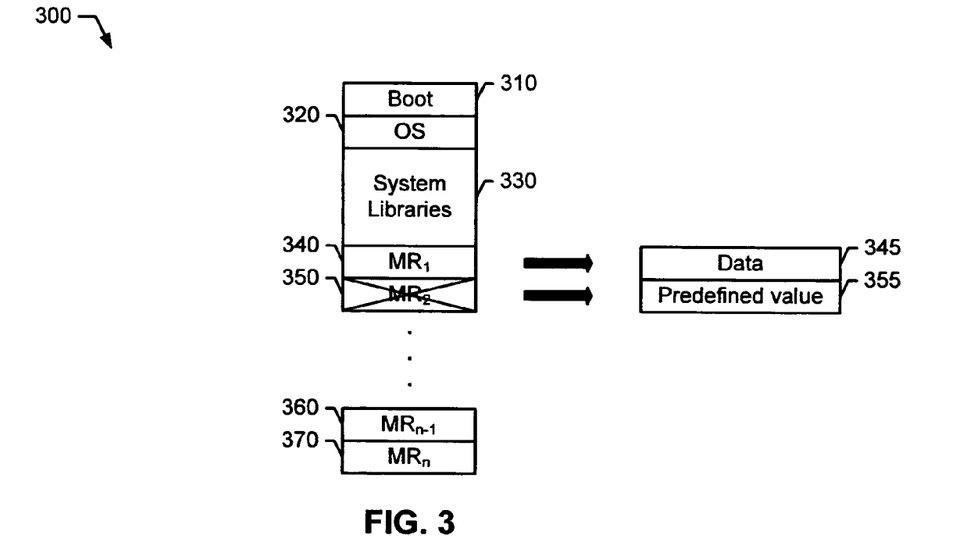
FIG. 3 depicts another example of a memory array configuration.

In the example of FIG. 3, a memory array configuration 300 may include one or more partitions, generally shown as 310, 320, 330, 340, 350, 360, and 370. The partitions 310, 320, 330, 340, 350, 360, and 370 may correspond to the partitions 210, 220, 230, 240, 250, 260, and 270 as described above in connection with FIG. 2, respectively. In particular, the CPU 110 may have an authentication key associated with each of the first and second memory ranges 340 and 350. With the first memory range 340 enabled for read access, the integrated controller 150 may provide the data stored in the first memory range 340 (e.g., the data 345) to the CPU 110.

In contrast to the second memory range 250 of the memory array configuration 200 in FIG. 2, the integrated controller 150 disabled read access of the second memory range 350. Thus, the data stored in the second memory range 350 may not be available to the CPU 110 (e.g., hidden from the CPU 110) even if the CPU 110 had an authentication key associated with the second memory range 350. Instead, the integrated controller 150 may provide a predefined value 355 stored in the register 175 to the CPU 110. The methods and apparatus described herein are not limited in this regard.

Figure 4:
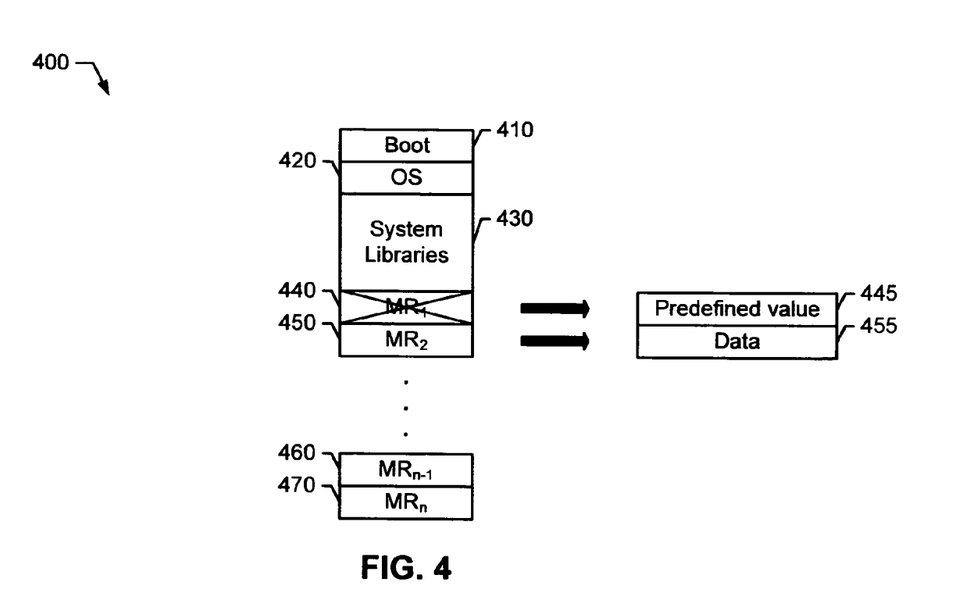
FIG. 4 depicts yet another example of a memory array configuration.

Turning to FIG. 4, for another example, a memory array configuration 400 may include one or more partitions, generally shown as 410, 420, 430, 440, 450, 460, and 470. The partitions 410, 420, 430, 440, 450, 460, and 470 may correspond to the partitions 310, 320, 330, 340, 350, 360, and 370 as described above in connection with FIG. 3, respectively. The CPU 110 may have an authentication key associated with each of the first and second memory ranges 440 and 450. With the second memory range 450 enabled for read access, the integrated controller 150 may provide the data stored in the second memory range 450 (e.g., the data 455) to the CPU 110.

In contrast to the first memory range 340 of the memory array configuration 300 in FIG. 3, the integrated controller 150 may disable read access of the first memory range 440.

Thus, the data 445 may not be available to the CPU 110 (e.g., hidden from the CPU 110) even if the CPU 110 had an authentication key associated with the first memory range 440. Instead the integrated controller 150 may provide a predefined value 445 stored in the register 175 to the CPU 110. The methods and apparatus described herein are not limited in this regard.

As mentioned above, the integrated controller 150 may have static read access control or dynamic read access control of the memory range 180. In particular, static read access control may disable read access of the memory range 180 until the flash device 120 is reset. In one example, static read access control may be used to protect information used during a boot process (e.g., over-the-air application code such as an update patch). After being accessed by the CPU 110, such information may not be accessible unless the flash device 120 is reset. The status for static read access control may be indicated by a non-volatile (NV) bit of the integrated controller 150.

Similar to static read access control, dynamic read access control may also disable read access of the memory range 180 until the flash device 120 is reset. However, dynamic read access control may enable read access of the memory range 180 in response to an authenticated read access command. Accordingly, dynamic read access control may toggle read access of the memory range 180 on or off. In one example, dynamic read access control may be used to provide isolation between an application and corresponding data. Thus, dynamic read access control may protect sensitive data of an application when the application is not running. The status for dynamic read access control may be indicated by a RAM bit of the integrated controller 150.

Figure 5:
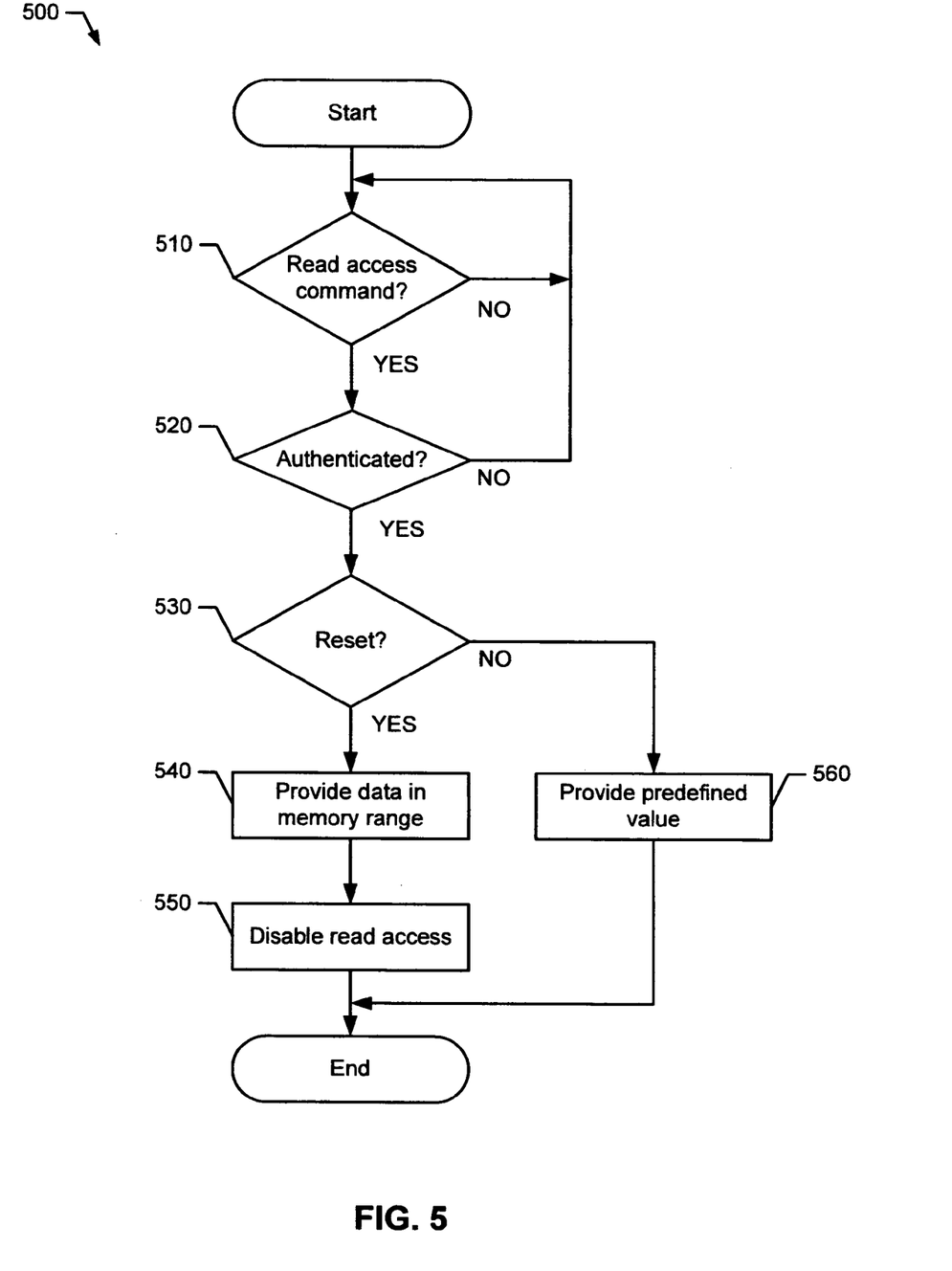
FIG. 5 is a flow diagram representation of one manner to provide a read access control system.
Figure 6:
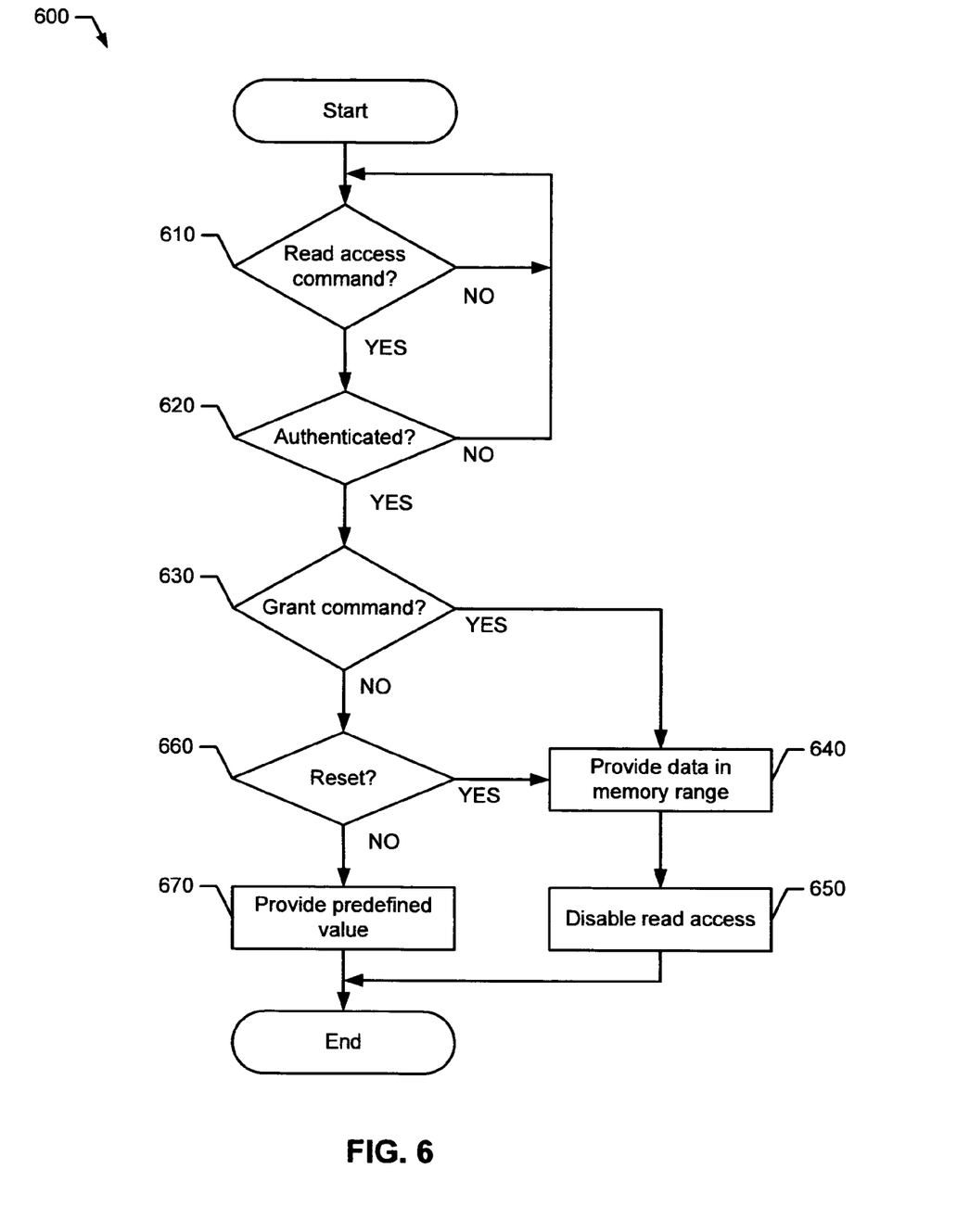
FIG. 6 is a flow diagram representation of another manner to provide a read control system.

FIGS. 5 and 6 depict manners in which the example flash memory-based processing system 100 of FIG. 1 may provide a read access control system associated with a flash device (e.g., the flash device 120 of FIG. 1). The example processes 500 and 600 of FIGS. 5 and 6, respectively, may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a ROM, a RAM, a magnetic media, an optical media, and/or any other suitable type of medium.

Further, although a particular order of actions is illustrated in each of FIGS. 5 and 6, these actions may be performed in other temporal sequences. For example, the actions illustrated in FIGS. 5 and/or 6 may be executed in repetitive, serial, and/or parallel manners. Again, the example processes 500 and 600 are merely provided and described in conjunction with the apparatus of FIG. 1 as examples to provide a read access control system associated with a flash device.

In a static read access mode, for example, the process 500 depicted in FIG. 5 may begin with the flash device 120 (e.g., via the integrated controller 150) monitoring for a read access command from the CPU 110 (block 510). In particular, the CPU 110 may request to access a particular memory range of the memory array 155 (e.g., the memory range 180 of FIG. 1). If the flash device 120 does not receive a read access command from the CPU 110, the integrated controller 150 may continue to monitor for a read access command.

Otherwise if the flash device 120 receives a read access command from the CPU at block 510, the integrated controller 150 may determine whether the read access command is an authenticated read access command (block 520). In one example, the read access command may be authenticated in accordance with an RSA signature protocol. If the read access command is not an authenticated read access command, controls may return to block 510. However, if the read access command is an authenticated read access command, the integrated controller 150 may determine whether the flash device 120 is reset (block 530). In one example, the flash device 120 may receive a reset command from the integrated controller 150 prior to and/or during a boot process.

If the flash device 120 is reset, the integrated controller 150 may provide data stored in the memory range 180 to the CPU 110 (block 540). Accordingly, the integrated controller 150 may disable read access of the memory range 180 (block 550). Otherwise if the flash device 120 is not reset at block 530, the integrated controller 150 may deny read access of the memory range 180 and provide a predefined value stored in the register 175 to the CPU 110 (block 560). The methods and apparatus described herein are not limited in this regard.

In a dynamic read access mode, for example, the process 600 depicted in FIG. 6 may begin with the flash device 120 (e.g., via the integrated controller 150) monitoring for a read access command from the CPU 110 (block 610). In particular, the CPU 110 may request to access a particular memory range of the memory array 155 (e.g., the memory range 180 of FIG. 1). If the flash device 120 does not receive a read access command from the CPU 110, the integrated controller 150 may continue to monitor for a read access command.

Otherwise if the flash device 120 receives a read access command from the CPU at block 610, the integrated controller 150 may determine whether the read access command is an authenticated read access command (block 620). If the read access command is not an authenticated read access command, controls may return to block 510. However, if the read access command is an authenticated read access command, the integrated controller 150 may monitor for a grant command to authorize read access of the memory range 180 (block 630).

If the integrated controller 150 detects a grant command, the integrated controller 150 may provide data stored in the memory range 180 to the CPU 110 (block 640). In particular, the grant command may enable read access to the memory range 180. Accordingly, the integrated controller 150 may disable read access of the memory range 180 (block 650). Otherwise if the integrated controller 150 fails to detect a grant command at block 630, the integrated controller 150 may determine whether the flash device 120 is reset (block 660).

If the flash device 120 is reset, the integrated controller 150 may provide data stored in the memory range 180 to the CPU 110 (block 640). Accordingly, the integrated controller 150 may disable read access of the memory range 180 (block 650). Otherwise if the flash device 120 is not reset at block 660, the integrated controller 150 may deny read access of the memory range 180 and provide a predefined value stored in the register 175 to the CPU 110 (block 670). The methods and apparatus described herein are not limited in this regard.

Although the above examples describe two read access modes (e.g., static read access mode and dynamic read access mode), the methods and apparatus described herein are readily applicable to operate in accordance with other suitable read access modes. While the methods and apparatus disclosed herein are described in FIGS. 5 and 6 to operate in a particular manner, the methods and apparatus disclosed herein are readily applicable without certain blocks depicted in FIGS. 5 and 6. In addition, while FIGS. 5 and 6 depict particular blocks, the actions performed by some of these blocks may be integrated within a single block or may be implemented using two or more separate blocks.

Figure 7:
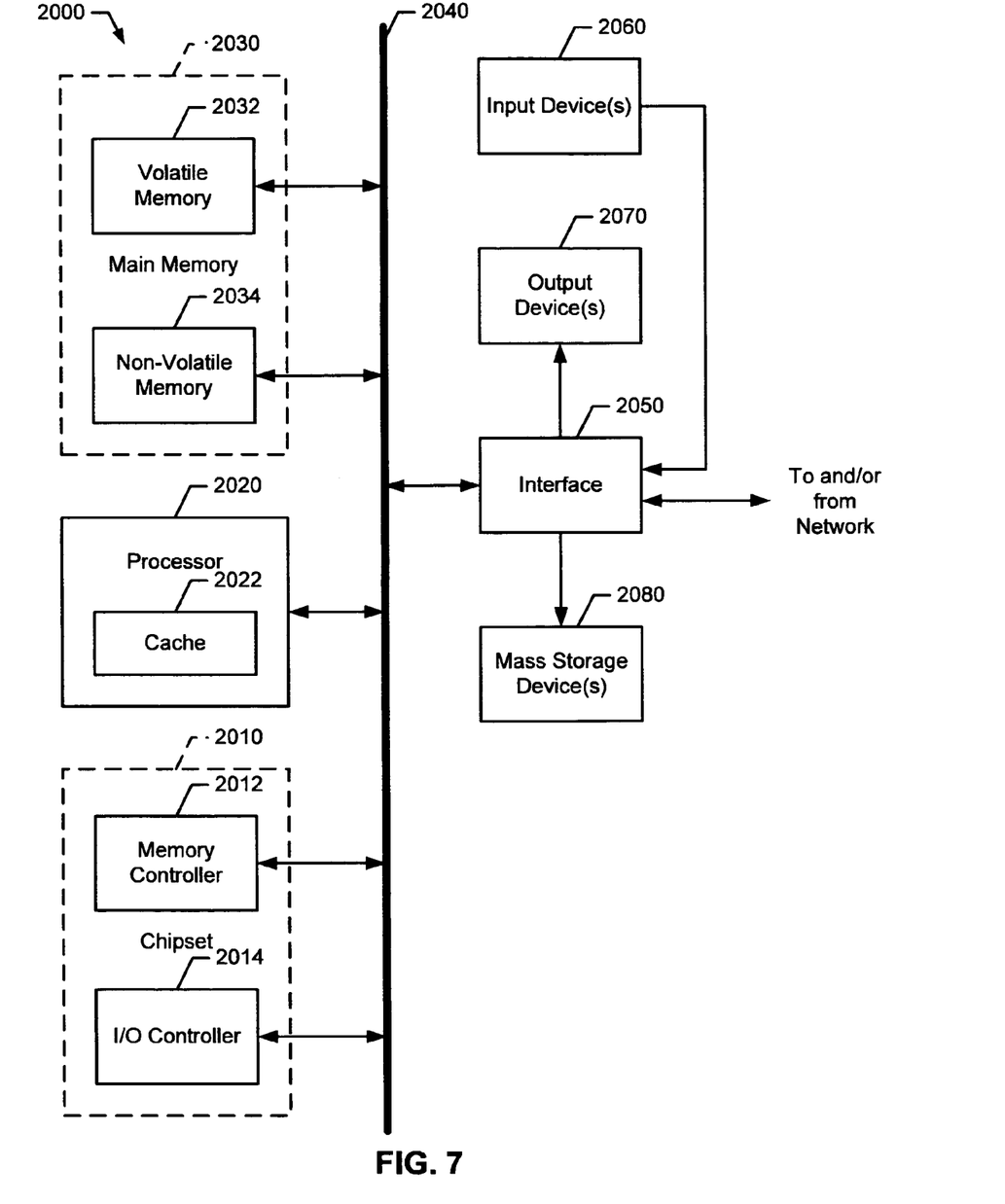
FIG. 7 is a block diagram representation of an example processor system that may be used to implement an example flash memory system of FIG. 1.

FIG. 7 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 7 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
receiving, by a flash device, a read access command configured to disable read access of a memory range of a memory array of the flash device after reading data within the memory range;
authenticating, by the flash device, the read access command based on a signature verification protocol at an integrated controller of the flash device, wherein the integrated controller is operatively coupled to a processor unit, the processor unit providing the read access command to access the memory range of the flash device;
providing, by the flash device, read access to the memory range of the memory array based on an authenticated read access command, wherein the authenticated read access command was determined to be a valid dynamic read access command based on the signature verification protocol; disabling read access to the memory range after the execution of the authenticated read access command; and
enabling, by the flash device prior to a reset of the flash device, further read access to the previously disabled memory range of the memory array based on receipt of another valid dynamic read access command, wherein the other valid dynamic read access command was determined to be a valid dynamic read access command based on the signature verification protocol.

2. A method as defined in claim 1, further comprising enabling, by the flash device, read access of the memory range in response to detecting a condition indicative of a reset of the flash device.

3. A method as defined in claim 1, further comprising:
receiving, by the flash device, a third read access command configured to disable read access to the memory range after reading the data in the memory range;
authenticating, by the flash device, the third read access command based on the authentication key, wherein the third read access command is determined to be an invalid authentication key; and
preventing read access of the memory range.

4. A method as defined in claim 3 comprising providing a predefined value to the processing unit in response to the preventing.

5. A method as defined in claim 1, wherein the the memory range is disabled after the providing by setting a volatile bit of the integrated controller, wherein the volatile bit is associated with a dynamic read access mode.

6. A method as defined in claim 1 further comprising storing a predefined value in a register associated with the flash device, wherein the predefined value is associated with the memory range.

7. An article of manufacture including content, which when accessed, causes a machine to:
receive a read access command configured to disable read access of a memory range of a memory array after reading data within the memory range;
authenticate the read access command based on a signature verification protocol at an integrated controller of a flash device operatively coupled to a processor unit, the processor unit providing the read access command to access a memory range of the flash device;
provide read access to the memory range of the memory array based on an authenticated read access command, wherein the authenticated read access command was determined to be a valid dynamic read access command based on the signature verification protocol; disable read access to the memory range after the execution of the authenticated read access command; and
enable further read access to the previously disabled memory range prior to a reset of the flash device based on receipt of another valid dynamic read access command, wherein the other valid dynamic read access command was determined to be a valid dynamic read access command based on the signature verification protocol.

8. An article of manufacture as defined in claim 7, wherein the content, when accessed, causes the machine to enable read access of the memory range to the processor unit in response to detecting a condition indicative of a reset of the flash device.

9. An article of manufacture as defined in claim 7, wherein the content, when accessed, causes the machine to disable read access of the memory range in response to receiving a third read access command, wherein the third read access command is identified as an un-authenticated dynamic read access command.

10. An article of manufacture as defined in claim 7, wherein the content, when accessed, causes the machine to disable read access of the memory range by setting a non-volatile (NV) bit of the integrated controller, wherein the NV bit is associated with a static read access mode.

11. An article of manufacture as defined in claim 7, wherein the content, when accessed, causes the machine to provide a predefined value to the processing unit in response to detecting a condition indicative of the memory range being disabled for read access.

12. An apparatus comprising:
a memory array having a memory range; and
a controller operatively coupled to the memory array to receive a read access command configured to disable read access of the memory range after reading the data within the memory range, to authenticate based on a signature verification protocol the read access command from a processor unit to access the memory range, to provide read access to the memory range of the memory array based on an authenticated read access command, wherein the authenticated read access command was determined to be a valid dynamic read access command based on the signature verification protocol; to disable read access to the memory range after the execution of the authenticated read access command, and to enable further read access of the disabled memory range prior to a reset of the apparatus based on the receipt of another valid dynamic read access command, wherein the other valid dynamic read access command was determined to be valid based on the signature verification protocol, and
wherein the controller is operatively coupled to the processing unit via a flash interface.

13. An apparatus as defined in claim 12, wherein the controller is configured to enable read access of the memory range to the processor unit in response to detecting a condition indicative of a reset of the flash device.

14. An apparatus as defined in claim 12, wherein the controller is configured to prevent read access of the memory range to the processor unit in response to receiving a third read access command, wherein the third read access command is identified as an un-authenticated dynamic read access command.

15. An apparatus as defined in claim 12, wherein the controller is configured to disable the memory range by setting a non-volatile (NV) bit of the controller, wherein the NV bit is associated with a static read access mode.

16. An apparatus as defined in claim 12 further comprising a register to store a predefined value for providing to the processing unit in response to detecting a condition indicative of the memory range being disabled for read access.

17. A system comprising:
a processing unit; and
a flash device operatively coupled to the processing unit via a flash interface, the flash device having a memory array and an integrated controller to receive a read access command configured to disable read access of a memory range of the memory array after reading data within the memory range, to authenticate, based on a signature verification protocol, the read access command from a processor unit to access the memory range of the memory array, to provide read access to the memory range of the memory array based on an authenticated read access command, wherein the authenticated read access command is determine to be a valid read access command based on the signature verification protocol; to disable read access to the memory range after the execution of the authenticated read access command and to enable further read access to the previously disabled memory range prior to a reset of the flash device based on receipt of another valid dynamic read access command, wherein the other valid dynamic read access command was determined to be a valid dynamic read access command based on the signature verification protocol.

18. A system as defined in claim 17, wherein the integrated controller is configured to enable read access of the memory range to the processor unit in response to detecting a condition indicative of a reset of the flash device.

19. A system as defined in claim 17, wherein the integrated controller is configured to disable the memory range based a non-volatile (NV) bit of the integrated controller, wherein the NV bit is associated with a static read access mode.

20. A system as defined in claim 17, wherein the integrated controller is configured to provide a predefined value stored in a register of the memory array to the processing unit in response to detecting a condition indicative of the memory range being disabled for read access.

* * * * *

UNITED STATES PATENT AND TRADEMARK OFFICE
CERTIFICATE OF CORRECTION

PATENT NO. : 7,613,891 B2 Page 1 of 1
APPLICATION NO. : 11/429025
DATED : November 3, 2009
INVENTOR(S) : John C. Rudelic It is certified that error appears in the above-identified patent and that said Letters Patent is hereby corrected as shown below:

Column 9
Line 16, "4...in claim 3 comprising..." should read --4...in claim 3 further comprising..--.
Line 19, "5..., wherein the the memory range..." should read --5..., wherein the memory range...--.

Column 10
Line 58, "17. ...is determine to be..." should read --17. ...is determined to be...--.

Column 11
Lines 6-7, "19. ...based a non-volatile (NV) bit..." should read --19. ...based on a non-volatile (NV) bit...--.

Signed and Sealed this
Thirty-first Day of May, 2011

David J. Kappos
*Director of the United States Patent and Trademark Office*